UNITED STATES PATENT OFFICE.

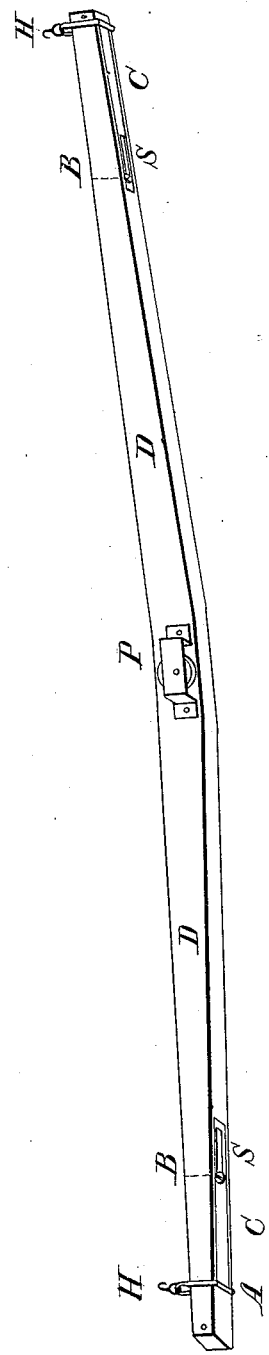

CHARLES C. BRADLEY, OF BRODHEAD, WISCONSIN.

IMPROVEMENT IN DOUBLETREES.

Specification forming part of Letters Patent No. 33,820, dated December , 1861.

*To all whom it may concern:*

Be it known that I, CHARLES C. BRADLEY, of Broadhead, in the county of Green and State of Wisconsin, have invented a new and Improved Mode of Constructing Doubletrees; and I do hereby declare that the following is a full and exact description thereof, reference being had to the accompanying drawing, and to the letters of reference marked thereon.

The nature of my invention consists in making an evener or doubletree for wheeled or other vehicles which dispenses entirely with singletrees.

To enable others to make and use my invention, I will proceed to describe its construction and operation.

I make my doubletree of sufficient length to receive the outside traces, which are to be attached to the same, as shown at H H in the accompanying drawing. The inside traces are connected around a wheel or pulley P, making the two virtually one, by which both horses (or other animals used) draw, so that they cannot draw otherwise than equally on this trace. The hooks H H are attached to the chafe-irons C C, which are placed on the back side of the doubletree D D, through both of which the bolts B B pass, enabling the hook to be moved the length of the slots S S toward the draft-bolt, thus "giving advantage," as shown at A in the drawing.

The operation of this doubletree is as follows: When one animal is in advance of its fellow it draws the near one's inside trace around the pulley P just as far as its own end of the doubletree D advances, as is shown by the accompanying model. When the hooks H H are both at an equal distance from the center-bolt, which passes through the doubletree and pulley, each animal necessarily draws equally; but when one hook, as shown at A in the drawing, is moved two inches toward the center of draft, the opposite animal, or the one attached to the opposite end of the doubletree, has one inch the advantage, and only one, since only half its force is exerted on the doubletree.

The advantages of this doubletree are these:

First. It is much cheaper—at least fifty per cent.

Second. It is much less cumbrous — of course neater in appearance.

Third. There being no singletrees to topple about, the traces are kept up better in plowing and such work.

Fourth. Horses may be geared on this so it is quite impossible for them to crowd each other, which you can demonstrate with the model, by shortening the outside traces. The center of draft of each animal is thrown farther away from the main center, and of course the horses are.

Fifth. This method of attaching the hooks to movable irons, with the bolts running through the timber, is the right way to strengthen it, instead of boring several holes to move the clevis, as in the common forms, thereby weakening the doubletree somewhat.

What I claim as my invention, and desire to secure by Letters Patent, is—

The construction of a doubletree which dispenses entirely with singletrees, and the application of the central pulley as a substitute therefor; also, the method herein described of attaching the trace-hooks to a movable slide with the slot therein, or substantially the same.

CHS. C. BRADLEY.

Witnesses:
S. P. TAFT,
R. C. LAIRD.